United States Patent
Lee et al.

(10) Patent No.: US 12,439,336 B2
(45) Date of Patent: Oct. 7, 2025

(54) APPARATUS FOR MINIMIZING POWER CONSUMPTION AND CHANNEL RESOURCE IN WIRELESS LAN SYSTEM UTILIZING WAKEUP SIGNAL RECEIVER

(71) Applicant: NEWRACOM, Inc., Lake Forest, CA (US)

(72) Inventors: Joonsoo Lee, Seoul (KR); Junyoun Won, Irvine, CA (US); Hyun Sik Jung, Seoul (KR); Hyungu Park, Irvine, CA (US)

(73) Assignees: NEWRACOM, Inc., Irvine, CA (US); NEWRATEK, Inc., Seoul (KR)

( * ) Notice: Subject to any disclaimer, the term of this patent is extended or adjusted under 35 U.S.C. 154(b) by 400 days.

(21) Appl. No.: 17/807,367

(22) Filed: Jun. 16, 2022

(65) Prior Publication Data
US 2022/0408358 A1    Dec. 22, 2022

Related U.S. Application Data

(60) Provisional application No. 63/211,431, filed on Jun. 16, 2021.

(51) Int. Cl.
*H04W 52/02* (2009.01)
*H04L 5/00* (2006.01)

(52) U.S. Cl.
CPC ....... *H04W 52/0229* (2013.01); *H04L 5/0053* (2013.01); *H04W 52/028* (2013.01)

(58) Field of Classification Search
CPC ............ H04L 5/0053; H04W 52/0229; H04W 52/028
See application file for complete search history.

(56) References Cited

U.S. PATENT DOCUMENTS 11,765,657 B2 *  9/2023  Ahn ................ H04W 52/0229
                                                    370/311
11,864,114 B2 *  1/2024  Yang ................. H04W 52/0216
(Continued)

OTHER PUBLICATIONS

Yoon et al., "A new approach to low-power and low-latency wake-up receiver system for wireless sensor node", IEEE J. Solid-State Circuits, vol. 47, No. 10, pp. 2405-2419, Oct. 2013 (Year: 2013).*

(Continued)

*Primary Examiner* — Shah M Rahman
(74) *Attorney, Agent, or Firm* — Nicholson, De Vos, Webster & Elliott, LLP; Daniel J. Lee

(57) ABSTRACT

A method performed by a wireless device for wirelessly transmitting a wake-up signal and data frame to one or more other wireless devices. The method includes wirelessly transmitting a wake-up signal to the one or more other wireless devices, wirelessly receiving a response frame that is responsive to the wake-up signal from one of the one or more other wireless devices before an estimated full transition delay has elapsed after the wake-up signal was transmitted, wherein the estimated full transition delay includes an estimated delay to activate a radio frequency or baseband component and an estimated delay to load a program for execution, and wirelessly transmitting, after the estimated full transition delay has elapsed, a data frame that includes data intended for the one or more other wireless device in response to a determination that the response frame has been received.

20 Claims, 15 Drawing Sheets

(56) References Cited

U.S. PATENT DOCUMENTS

| | | | | |
|---|---|---|---|---|
| 2014/0050133 | A1* | 2/2014 | Jafarian | H04W 74/085 370/311 |
| 2018/0376419 | A1* | 12/2018 | Li | H04W 52/0222 |
| 2019/0069231 | A1* | 2/2019 | Kneckt | H04W 52/0235 |
| 2019/0191376 | A1* | 6/2019 | Kim | H04W 74/06 |
| 2020/0137685 | A1* | 4/2020 | Kim | H04W 52/0245 |
| 2020/0187120 | A1* | 6/2020 | Alanen | H04W 52/0212 |
| 2020/0260382 | A1* | 8/2020 | Ljung | H04L 5/0048 |
| 2020/0275369 | A1* | 8/2020 | Foster | H04W 52/028 |
| 2020/0280920 | A1* | 9/2020 | Huang | H04W 52/0229 |
| 2021/0136862 | A1* | 5/2021 | He | H04B 17/318 |
| 2022/0141770 | A1* | 5/2022 | Ahn | H04W 52/0222 370/318 |
| 2022/0201610 | A1* | 6/2022 | Wilhelmsson | H04W 76/10 |
| 2022/0240183 | A1* | 7/2022 | Hassan | H04W 52/028 |
| 2023/0050355 | A1* | 2/2023 | Laselva | H04W 76/27 |
| 2023/0147636 | A1* | 5/2023 | Kim | H04W 76/15 370/318 |
| 2024/0064640 | A1* | 2/2024 | Alpert | H04W 52/0229 |
| 2024/0064646 | A1* | 2/2024 | Wang | H04W 52/0229 |

OTHER PUBLICATIONS

Zhang et al., "An analytical model for energy efficiency analysis of different wakeup radio schemes", Proc. IEEE 20th International Symposium on Personal, Indoor and Mobile Radio Comm., pp. 1148-1152, 2009. (Year: 2009).*
IEEE_802_11ba-2021, "IEEE Standard for Information Technology—Telecommunications and Information Exchange between Systems Local and Metropolitan Area Networks—Specific Requirements", Part 11: Wireless LAN Medium Access Control (MAC) and Physical Layer (PHY) Specifications, Amendment 3: Wake-Up Radio Operation, Mar. 25, 2021, 180 pages.
IEEE_802_11p-2010, "IEEE Standard for Information technology—Telecommuications and information exchange between systems—Local and metropolitan area networks—Specific Requirments", Part 11: Wireless LAN Medium Access Control (MAC) and Physical Layer (PHY) Specifications", Amendment 6: Wireless Access in Vehicular Environments", Jul. 15, 2010, 51 pages.
IEEE 802.11-2016, "Part 11: Wireless LAN Medium Access Control (MAC) and Physical Layer (PHY) Specifications," Standard, Institute of Electrical and Electronics Engineers, Inc. (IEEE), Dec. 7, 2016, 3534 pages.
IEEE P802.11ax/D8.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 1: Enhancements for High Efficiency WLAN, Oct. 2020, 820 pages.
IEEE P802.11be/D1.0, "Draft Standard for Information technology—Telecommunications and information exchange between systems Local and metropolitan area networks—Specific requirements", Part 11: Wireless LAN Medium Access Control (MAC) and Physical Layer (PHY) Specifications, Amendment 8: Enhancements for extremely high throughput (EHT), May 2021, 635 pages.
IEEE Std 802.11a-1999(R2003): "Part 11: Wireless LAN Medium Access Control (MAC) and Physical Layer (PHY) Specifications, High-speed Physical Layer in the 5 GHz Band," IEEE Standard for Information technology—Telecommunications and information exchange between systems, Local and metropolitan area networks—Specific requirements, reaffirmed Jun. 12, 2003, copyright 1999, 91 pages.
IEEE Std 802.11ac-2013 "Part 11: Wireless LAN Medium Access Control (MAC) and Physical Layer (PHY) Specifications, Amendment 4: Enhancements for Very High Throughput for Operation in Bands below 6 GHz," IEEE Standard for Information technology—Telecommunicationsand information exchange between systems, Local and metropolitan area networks—Specific requirements, Dec. 18, 2013, 425 pages.
IEEE Std 802.11ah-2016, "Part 11: Wireless LAN Medium Access Control (MAC) and Physical Layer (PHY) Specifications, Amendment 2: Sub 1 GHz License Exempt Operation", IEEE Standard for Information technology—Telecommunications and information exchange between systems, Local and metropolitan area networks—Specific requirements, 2016, 594 pages.
IEEE Std 802.11g-2003: "Part 11: Wireless LAN Medium Access Control (MAC) and Physical Layer (PHY) Specifications, Amendment 4: Further Higher Data Rate Extension in the 2.4 GHz Band," IEEE Standard for Information technology—Telecommunications and information exchange between systems, Local and metropolitan area networks—Specific requirements, Jun. 27, 2003, 78 pages.
IEEE Std 802.11n-2009: "Part 11: Wireless LAN Medium Access Control (MAC) and Physical Layer (PHY) Specifications, Amendment 5: Enhancements for Higher Throughput," IEEE Standard for Information technology—Telecommunications and information exchange between systems, Local and metropolitan area networks—Specific requirements, Oct. 29, 2009, 536 pages.
IEEE Std P802.11bd/D1.1, Part 11: Wireless LAN Medium Access Control (MAC) and Physical Layer (PHY) Specifications, Amendment 5: Enhancements for Next Generation Vehicular Communication, IEEE Draft Standard for Information technology—Telecommunications and information exchange between systems, Local and metropolitan area networks—Specific requirements, Dec. 2020, 102 pages.
IEEE Std. 802.11b-1999: "Higher Speed Physical Layer (PHY) Extension in the 2.4 GHz Band," IEEE Standard for Information Technology, Telecommunications and information exchange between systems, Local and Metropolitan networks, Specific requirements, Part 11: Wireless LAN Medium Access Control (MAC) and Physical Layer (PHY) specifications, Sep. 16, 1999, 96 pages.

* cited by examiner

| | |
|---|---|
| Frequency Band | License-exempt bands below 1 GHz, excluding the TV white spaces |
| Channel Width | 1/2/4/8/16 MHz |
| Modulation Schemes | BPSK, QPSK, 16-QAM, 64-QAM, 256-QAM |
| Maximum Number of Spatial Streams | Four spatial streams |
| Range | Up to 1Km (outdoor) |
| End Node Transmit Power | Dependent on regional regulations (from 1 mW to 1 W) |
| Packet Size | Up to 7,991 bytes (without aggregation) up to 65,535 bytes (with aggregation) |
| Data Rate | 150 kb/s (1 MHz channel bandwidth, 1 spatial stream, BPSK, 1/2 coding rate, repetition coding) to 347 Mb/s (16 MHz channel bandwidth, 4 spatial streams, 256 QAM, 5/6 coding rate) |
| Number of Stations | Up to 6000 |
| Location | Indoor and outdoor |
| Traffic Type | Periodic packet transmission every few to tens minutes |

FIG. 6

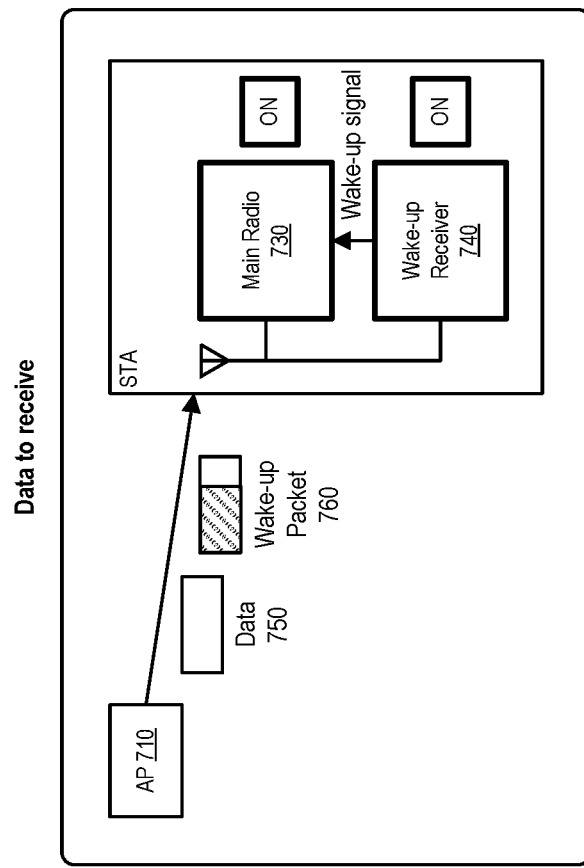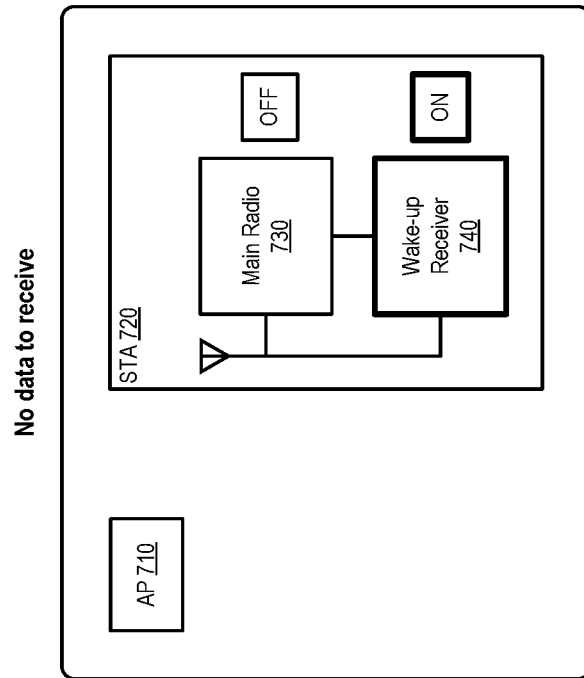
FIG. 7

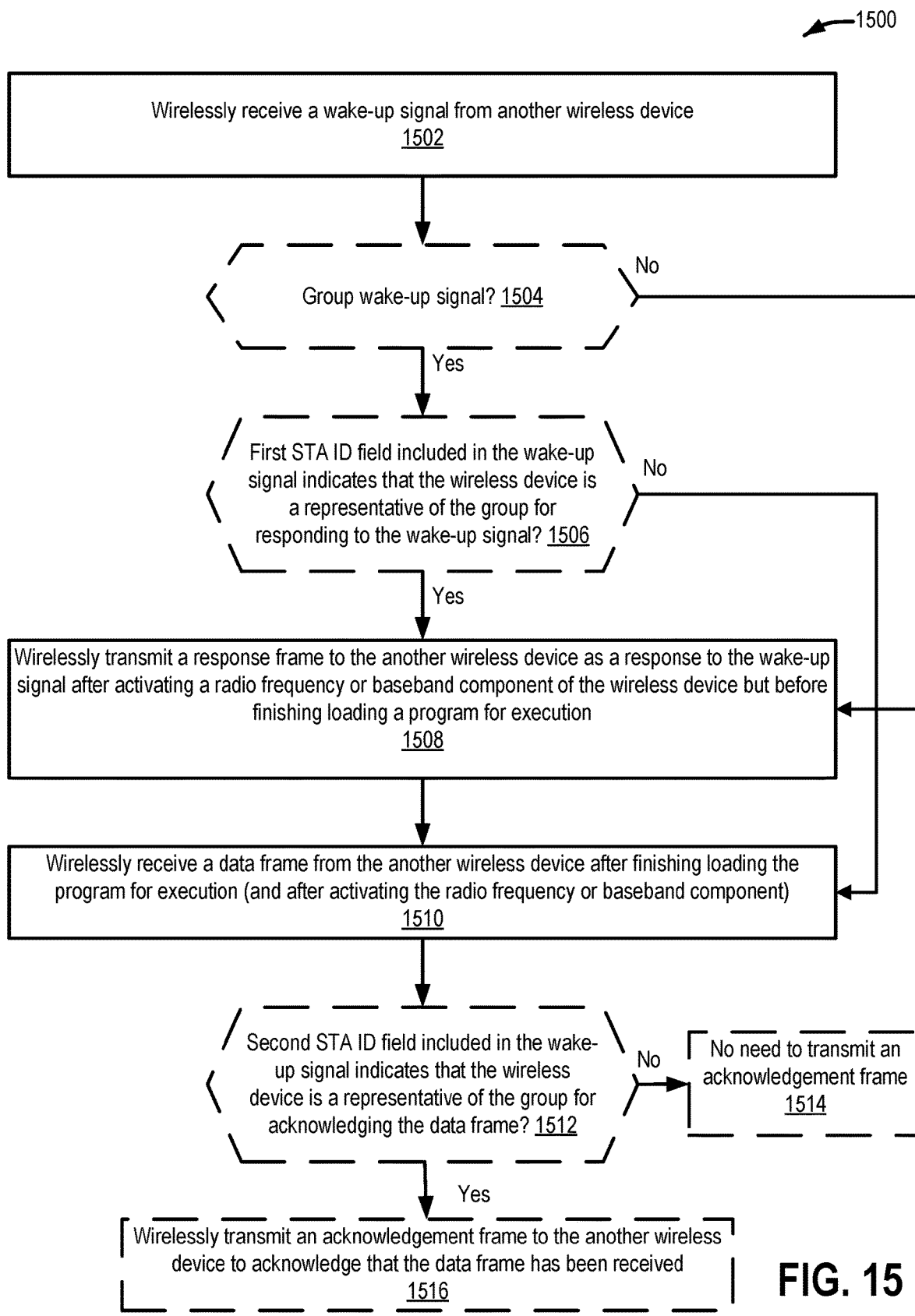

APPARATUS FOR MINIMIZING POWER CONSUMPTION AND CHANNEL RESOURCE IN WIRELESS LAN SYSTEM UTILIZING WAKEUP SIGNAL RECEIVER

CROSS-REFERENCE TO RELATED APPLICATION

This application claims the benefit of U.S. Provisional Application No. 63/211,431, filed Jun. 16, 2021 which is hereby incorporated by reference.

TECHNICAL FIELD

The present disclosure generally relates to wireless communications, and more specifically, relates to reducing power consumption in a wireless network using a wake-up receiver.

BACKGROUND

Institute of Electrical and Electronics Engineers (IEEE) 802.11 is a set of physical and Media Access Control (MAC) specifications for implementing Wireless Local Area Network (WLAN) communications. These specifications provide the basis for wireless network products using the Wi-Fi brand managed and defined by the Wi-Fi Alliance. The specifications define the use of the 2.400-2.500 Gigahertz (GHz) as well as the 4.915-5.825 GHz bands. These spectrum bands are commonly referred to as the 2.4 GHz and 5 GHz bands. Each spectrum is subdivided into channels with a center frequency and bandwidth. The 2.4 GHz band is divided into 14 channels spaced 5 Megahertz (MHz) apart, though some countries regulate the availability of these channels. The 5 GHz band is more heavily regulated than the 2.4 GHz band and the spacing of channels varies across the spectrum with a minimum of a 5 MHz spacing dependent on the regulations of the respective country or territory.

The IEEE 802.11ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

The IEEE 802.11ah standard offers various low power features. However, they are not adequate in some application that require ultra-low power consumption as well as low latency time at the same time during the power save mode.

In some wireless communication systems, when a wireless device does not have any data to transmit or receive, the wireless device may enter a doze state to save power. Also, the wireless device may set a duty cycle to periodically wake up from the doze state to check whether data transmission or reception is required. The wireless device can save more power by staying in the doze state longer but this increases the probability that the wireless device does not receive data intended for itself. To address this tradeoff, the concept of wake-up receiver (also referred to as "WUR") has been introduced in recent wireless communications systems.

A wake-up receiver may operate as a discrete module or unit that is separate from the main radio. Alternatively, the wake-up receiver may be implemented as a part of the main radio. Assuming that communications between the main radios of wireless devices are required, if the wake-up receiver of a wireless device receives a specific wireless signal from another wireless device (sometimes referred to as a "wake-up signal"), the wake-up receiver may play a role in transitioning the main radio of the wireless device from a doze/sleep state to an awake state. Since the main radio consumes more power, it may stay in the doze state most of the time to reduce power consumption. The wake-up receiver may cause the main radio to wake up from the doze state only when data transmission or reception by the main radio is required. As a result, power consumption of the wireless device can be significantly reduced compared to other power save protocols. When such a wake-up receiver is used, it is not necessary to periodically wake up the entire main radio to check whether there is valid data to receive or transmit. Instead, the wake-up receiver, which consumes comparatively less power than the main radio, may listen for a signal indicating that the wireless device should wake up. The wake-up receiver may periodically transition to the doze state rather than always being in a state that can accept reception, so that even the power consumed by the wake-up receiver itself can be reduced. As a result, the power consumption of the entire system can be reduced.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 shows a table listing various characteristics of 802.11ah, according to some embodiments.

FIG. 7 is a diagram showing operational examples of a low-power wake-up receiver when there is data to receive and when there is no data to receive, according to some embodiments.

FIG. 15 is a diagram showing a method for wirelessly receiving and processing a wake-up signal, according to some embodiments.

DETAILED DESCRIPTION

Figure 1:
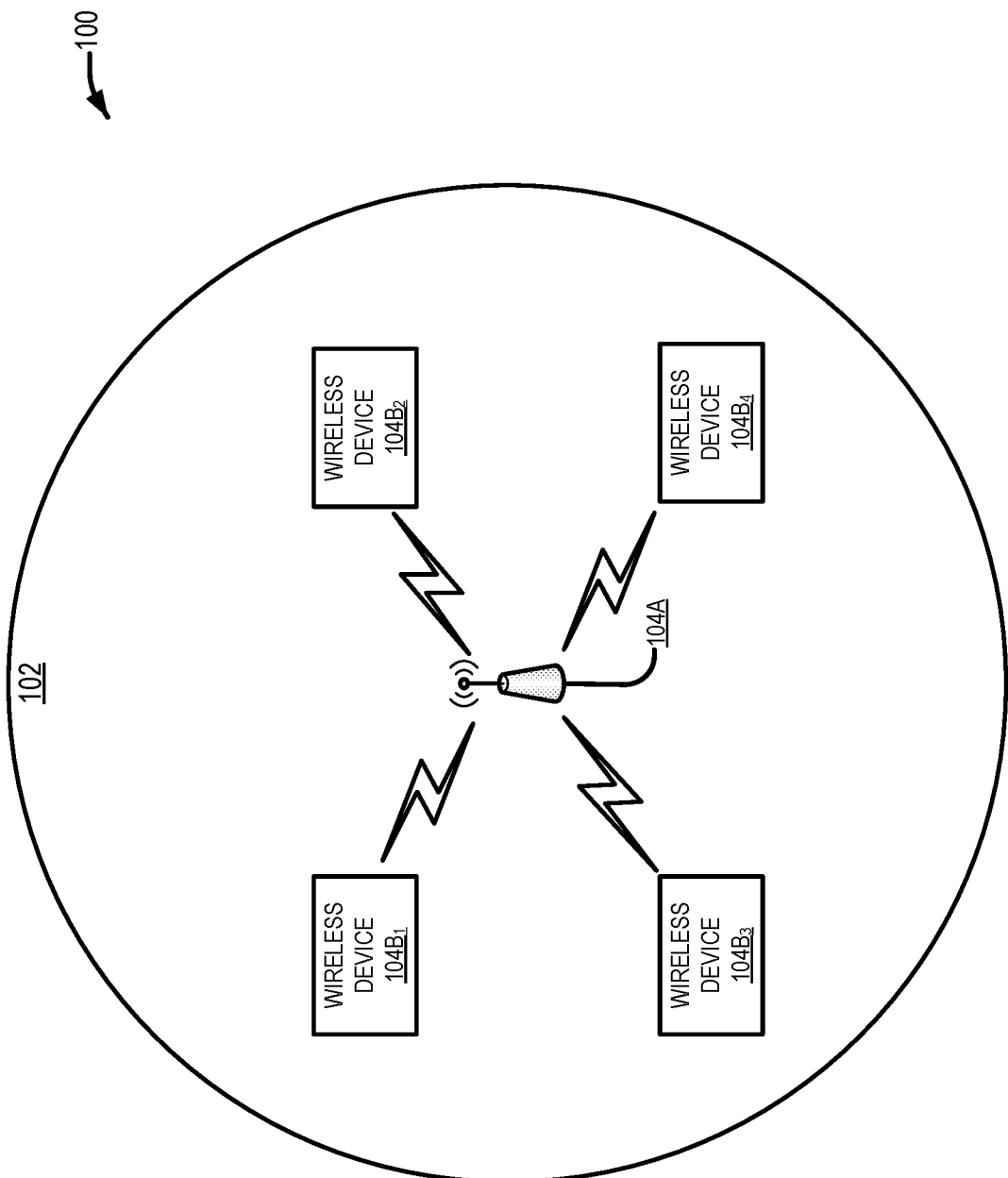
FIG. 1 illustrates an example wireless local area network (WLAN) with a basic service set (BSS) that includes a plurality of wireless devices, in accordance with some embodiments of the present disclosure.

The present disclosure generally relates to wireless communications, and more specifically, relates to reducing power consumption and increasing channel usage efficiency in a wireless network using a wake-up receiver.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a wireless local area network (WLAN) 100 with a basic service set (BSS) 102 that includes a plurality of wireless devices 104 (sometimes referred to as WLAN devices 104). Each of the wireless devices 104 may include a medium access control (MAC) layer and a physical (PHY) layer according to an IEEE (Institute of Electrical and Electronics Engineers) standard 802.11, including one or more of the amendments (e.g., 802.11a/b/g/n/p/ac/ax/bd/be). In one embodiment, the MAC layer of a wireless device 104 may initiate transmission of a frame to another wireless device 104 by passing a PHY-TXSTART.request (TXVECTOR) to the PHY layer. The TXVECTOR provides parameters for generating and/or transmitting a corresponding frame. Similarly, a PHY layer of a receiving wireless device may generate an RXVECTOR, which includes parameters of a received frame and is passed to a MAC layer for processing.

The plurality of wireless devices 104 may include a wireless device 104A that is an access point (sometimes referred to as an AP station or AP STA) and the other wireless devices 104B$_1$-104B$_4$ that are non-AP stations (sometimes referred to as non-AP STAs). Alternatively, all the plurality of wireless devices 104 may be non-AP STAs in an ad-hoc networking environment. In general, the AP STA (e.g., wireless device 104A) and the non-AP STAs (e.g., wireless devices 104B$_1$-104B$_4$) may be collectively referred to as STAs. However, for ease of description, only the non-AP STAs may be referred to as STAs. Although shown with four non-AP STAs (e.g., the wireless devices 104B$_1$-104B$_4$), the WLAN 100 may include any number of non-AP STAs (e.g., one or more wireless devices 104B).

Figure 2:
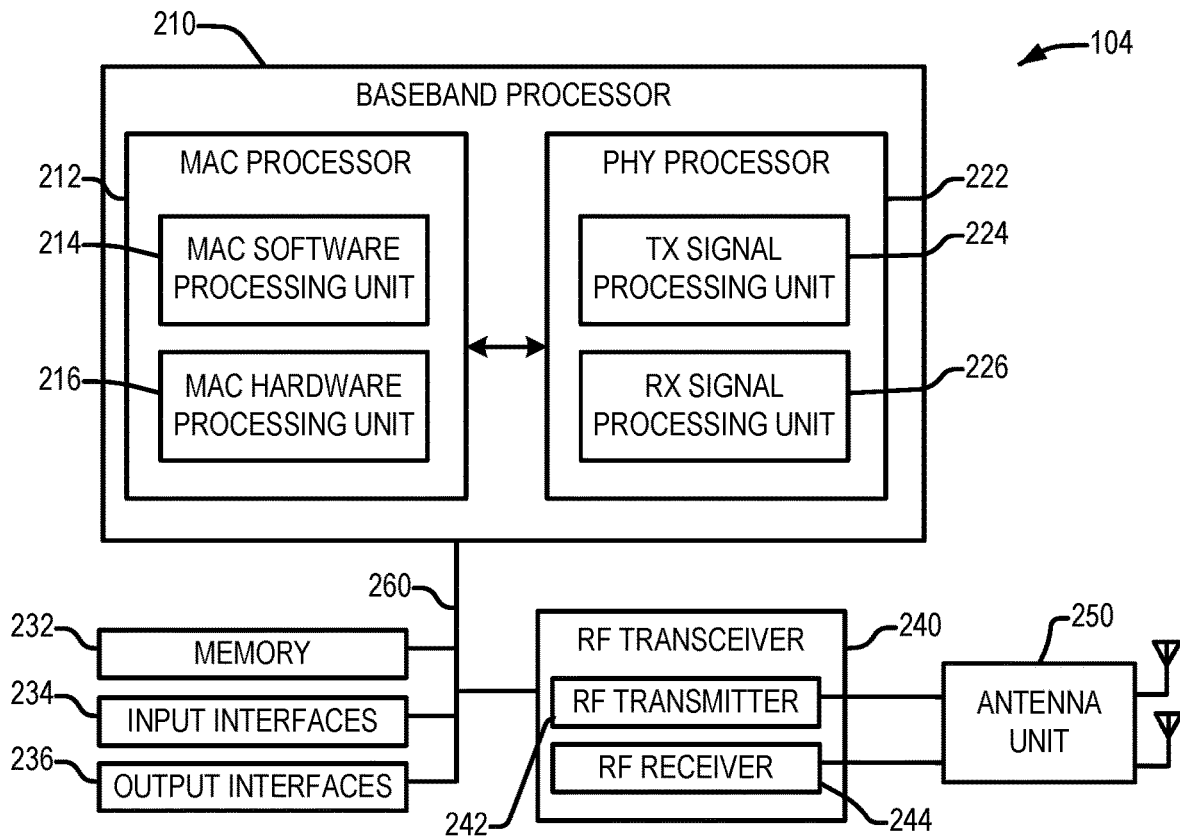
FIG. 2 is a schematic diagram of a wireless device, in accordance with some embodiments of the present disclosure.

FIG. 2 illustrates a schematic block diagram of a wireless device 104, according to an embodiment. The wireless device 104 may be the wireless device 104A (i.e., the AP of the WLAN 100) or any of the wireless devices 104B$_1$-104B$_4$ in FIG. 1. The wireless device 104 includes a baseband processor 210, a radio frequency (RF) transceiver 240, an antenna unit 250, a storage device (e.g., memory) 232, one or more input interfaces 234, and one or more output interfaces 236. The baseband processor 210, the storage device 232, the input interfaces 234, the output interfaces 236, and the RF transceiver 240 may communicate with each other via a bus 260.

The baseband processor 210 performs baseband signal processing and includes a MAC processor 212 and a PHY processor 222. The baseband processor 210 may utilize the memory 232, which may include a non-transitory computer/machine readable medium having software (e.g., computer/machine programing instructions) and data stored therein.

In an embodiment, the MAC processor 212 includes a MAC software processing unit 214 and a MAC hardware processing unit 216. The MAC software processing unit 214 may implement a first plurality of functions of the MAC layer by executing MAC software, which may be included in the software stored in the storage device 232. The MAC hardware processing unit 216 may implement a second plurality of functions of the MAC layer in special-purpose hardware. However, the MAC processor 212 is not limited thereto. For example, the MAC processor 212 may be configured to perform the first and second plurality of functions entirely in software or entirely in hardware according to an implementation.

The PHY processor 222 includes a transmitting (TX) signal processing unit (SPU) 224 and a receiving (RX) SPU 226. The PHY processor 222 implements a plurality of functions of the PHY layer. These functions may be performed in software, hardware, or a combination thereof according to an implementation.

Functions performed by the transmitting SPU 224 may include one or more of Forward Error Correction (FEC) encoding, stream parsing into one or more spatial streams, diversity encoding of the spatial streams into a plurality of space-time streams, spatial mapping of the space-time streams to transmit chains, inverse Fourier Transform (iFT) computation, Cyclic Prefix (CP) insertion to create a Guard Interval (GI), and the like. Functions performed by the receiving SPU 226 may include inverses of the functions performed by the transmitting SPU 224, such as GI removal, Fourier Transform computation, and the like.

The RF transceiver 240 includes an RF transmitter 242 and an RF receiver 244. The RF transceiver 240 is configured to transmit first information received from the baseband processor 210 to the WLAN 100 (e.g., to another WLAN device 104 of the WLAN 100) and provide second information received from the WLAN 100 (e.g., from another WLAN device 104 of the WLAN 100) to the baseband processor 210.

The antenna unit 250 includes one or more antennas. When Multiple-Input Multiple-Output (MIMO) or Multi-User MIMO (MU-MIMO) is used, the antenna unit 250 may include a plurality of antennas. In an embodiment, the antennas in the antenna unit 250 may operate as a beamformed antenna array. In an embodiment, the antennas in the antenna unit 250 may be directional antennas, which may be fixed or steerable.

The input interfaces 234 receive information from a user, and the output interfaces 236 output information to the user. The input interfaces 234 may include one or more of a keyboard, keypad, mouse, touchscreen, microphone, and the like. The output interfaces 236 may include one or more of a display device, touch screen, speaker, and the like.

As described herein, many functions of the WLAN device 104 may be implemented in either hardware or software. Which functions are implemented in software and which functions are implemented in hardware will vary according to constraints imposed on a design. The constraints may include one or more of design cost, manufacturing cost, time to market, power consumption, available semiconductor technology, etc.

As described herein, a wide variety of electronic devices, circuits, firmware, software, and combinations thereof may be used to implement the functions of the components of the WLAN device 104. Furthermore, the WLAN device 104 may include other components, such as application processors, storage interfaces, clock generator circuits, power supply circuits, and the like, which have been omitted in the interest of brevity.

Figure 3A:
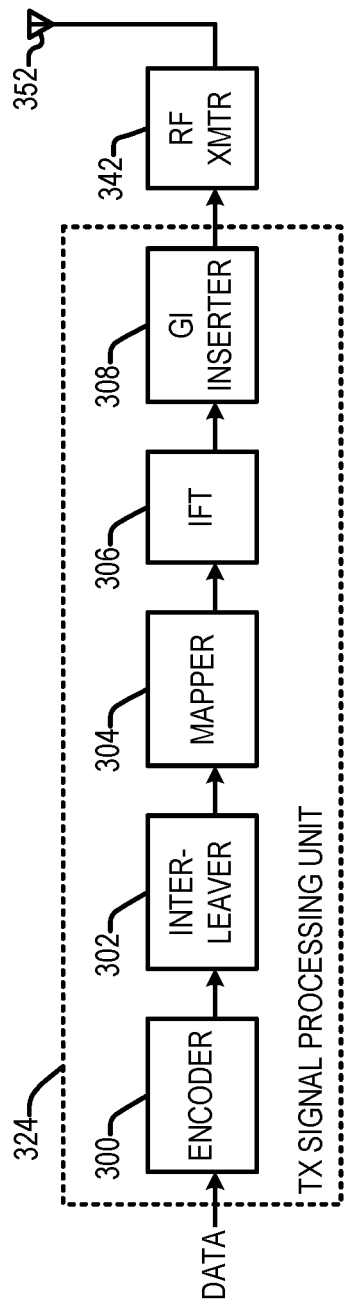
FIG. 3A illustrates components of a wireless device configured to transmit data, in accordance with some embodiments of the present disclosure.

FIG. 3A illustrates components of a WLAN device 104 configured to transmit data according to an embodiment, including a transmitting (Tx) SPU (TxSP) 324, an RF transmitter 342, and an antenna 352. In an embodiment, the TxSP 324, the RF transmitter 342, and the antenna 352 correspond to the transmitting SPU 224, the RF transmitter 242, and an antenna of the antenna unit 250 of FIG. 2, respectively.

The TxSP 324 includes an encoder 300, an interleaver 302, a mapper 304, an inverse Fourier transformer (IFT) 306, and a guard interval (GI) inserter 308.

The encoder 300 receives and encodes input data. In an embodiment, the encoder 300 includes a forward error correction (FEC) encoder. The FEC encoder may include a binary convolution code (BCC) encoder followed by a puncturing device. The FEC encoder may include a low-density parity-check (LDPC) encoder.

The TxSP 324 may further include a scrambler for scrambling the input data before the encoding is performed by the encoder 300 to reduce the probability of long sequences of 0s or 1s. When the encoder 300 performs the BCC encoding, the TxSP 324 may further include an encoder parser for demultiplexing the scrambled bits among a plurality of BCC encoders. If LDPC encoding is used in the encoder, the TxSP 324 may not use the encoder parser.

The interleaver 302 interleaves the bits of each stream output from the encoder 300 to change an order of bits therein. The interleaver 302 may apply the interleaving only when the encoder 300 performs BCC encoding and otherwise may output the stream output from the encoder 300 without changing the order of the bits therein.

The mapper 304 maps the sequence of bits output from the interleaver 302 to constellation points. If the encoder 300 performed LDPC encoding, the mapper 304 may also perform LDPC tone mapping in addition to constellation mapping.

When the TxSP 324 performs a MIMO or MU-MIMO transmission, the TxSP 324 may include a plurality of interleavers 302 and a plurality of mappers 304 according to a number of spatial streams (NSS) of the transmission. The TxSP 324 may further include a stream parser for dividing the output of the encoder 300 into blocks and may respectively send the blocks to different interleavers 302 or mappers 304. The TxSP 324 may further include a space-time block code (STBC) encoder for spreading the constellation points from the spatial streams into a number of space-time streams (NSTS) and a spatial mapper for mapping the space-time streams to transmit chains. The spatial mapper may use direct mapping, spatial expansion, or beamforming.

The IFT 306 converts a block of the constellation points output from the mapper 304 (or, when MIMO or MU-MIMO is performed, the spatial mapper) to a time domain block (i.e., a symbol) by using an inverse discrete Fourier transform (IDFT) or an inverse fast Fourier transform (IFFT). If the STBC encoder and the spatial mapper are used, the IFT 306 may be provided for each transmit chain.

When the TxSP 324 performs a MIMO or MU-MIMO transmission, the TxSP 324 may insert cyclic shift diversities (CSDs) to prevent unintentional beamforming. The TxSP 324 may perform the insertion of the CSD before or after the IFT 306. The CSD may be specified per transmit chain or may be specified per space-time stream. Alternatively, the CSD may be applied as a part of the spatial mapper.

When the TxSP 324 performs a MIMO or MU-MIMO transmission, some blocks before the spatial mapper may be provided for each user.

The GI inserter 308 prepends a GI to each symbol produced by the IFT 306. Each GI may include a Cyclic Prefix (CP) corresponding to a repeated portion of the end of the symbol that the GI precedes. The TxSP 324 may optionally perform windowing to smooth edges of each symbol after inserting the GI.

The RF transmitter 342 converts the symbols into an RF signal and transmits the RF signal via the antenna 352. When the TxSP 324 performs a MIMO or MU-MIMO transmission, the GI inserter 308 and the RF transmitter 342 may be provided for each transmit chain.

Figure 3B:
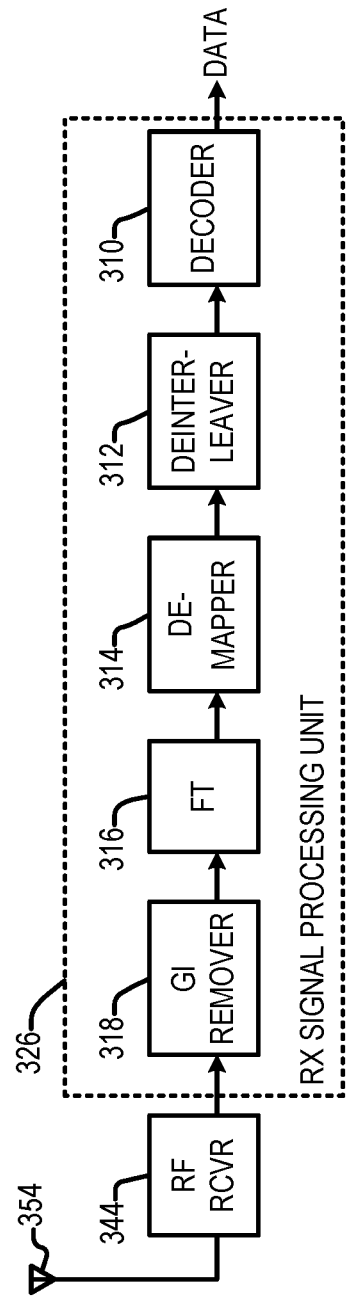
FIG. 3B illustrates components of a wireless device configured to receive data, in accordance with some embodiments of the present disclosure.

FIG. 3B illustrates components of a WLAN device 104 configured to receive data according to an embodiment, including a Receiver (Rx) SPU (RxSP) 326, an RF receiver 344, and an antenna 354. In an embodiment, the RxSP 326, RF receiver 344, and antenna 354 may correspond to the receiving SPU 226, the RF receiver 244, and an antenna of the antenna unit 250 of FIG. 2, respectively.

The RxSP 326 includes a GI remover 318, a Fourier transformer (FT) 316, a demapper 314, a deinterleaver 312, and a decoder 310.

The RF receiver 344 receives an RF signal via the antenna 354 and converts the RF signal into symbols. The GI remover 318 removes the GI from each of the symbols. When the received transmission is a MIMO or MU-MIMO transmission, the RF receiver 344 and the GI remover 318 may be provided for each receive chain.

The FT 316 converts each symbol (that is, each time domain block) into a frequency domain block of constellation points by using a discrete Fourier transform (DFT) or a fast Fourier transform (FFT). The FT 316 may be provided for each receive chain.

When the received transmission is the MIMO or MU-MIMO transmission, the RxSP 326 may include a spatial demapper for converting the respective outputs of the FTs 316 of the receiver chains to constellation points of a plurality of space-time streams, and an STBC decoder for despreading the constellation points from the space-time streams into one or more spatial streams.

The demapper 314 demaps the constellation points output from the FT 316 or the STBC decoder to bit streams. If the received transmission was encoded using LDPC encoding, the demapper 314 may further perform LDPC tone demapping before performing the constellation demapping.

The deinterleaver 312 deinterleaves the bits of each stream output from the demapper 314. The deinterleaver 312 may perform the deinterleaving only when the received transmission was encoded using BCC encoding, and otherwise may output the stream output by the demapper 314 without performing deinterleaving.

When the received transmission is the MIMO or MU-MIMO transmission, the RxSP 326 may use a plurality of demappers 314 and a plurality of deinterleavers 312 corresponding to the number of spatial streams of the transmission. In this case, the RxSP 326 may further include a stream deparser for combining the streams output from the deinterleavers 312.

The decoder 310 decodes the streams output from the deinterleaver 312 or the stream deparser. In an embodiment, the decoder 310 includes an FEC decoder. The FEC decoder may include a BCC decoder or an LDPC decoder.

The RxSP 326 may further include a descrambler for descrambling the decoded data. When the decoder 310 performs BCC decoding, the RxSP 326 may further include an encoder deparser for multiplexing the data decoded by a plurality of BCC decoders. When the decoder 310 performs the LDPC decoding, the RxSP 326 may not use the encoder deparser.

Before making a transmission, wireless devices such as wireless device 104 will assess the availability of the wireless medium using Clear Channel Assessment (CCA). If the medium is occupied, CCA may determine that it is busy, while if the medium is available, CCA determines that it is idle.

The PHY entity for IEEE 802.11 is based on Orthogonal Frequency Division Multiplexing (OFDM) or Orthogonal Frequency Division Multiple Access (OFDMA). In either OFDM or OFDMA Physical (PHY) layers, a STA (e.g., a wireless device 104) is capable of transmitting and receiving Physical Layer (PHY) Protocol Data Units (PPDUs) that are compliant with the mandatory PHY specifications. A PHY specification defines a set of Modulation and Coding Schemes (MCS) and a maximum number of spatial streams. Some PHY entities define downlink (DL) and uplink (UL) Multi-User (MU) transmissions having a maximum number of space-time streams (STS) per user and employing up to a predetermined total number of STSs. A PHY entity may provide support for 10 Megahertz (MHz), 20 MHz, 40 MHz, 80 MHz, 160 MHz, 240 MHz, and 320 MHz contiguous channel widths and support for an 80+80, 80+160 MHz, and 160+160 MHz non-contiguous channel width. Each channel includes a plurality of subcarriers, which may also be referred to as tones. A PHY entity may define signaling fields denoted as Legacy Signal (L-SIG), Signal A (SIG-A), and Signal B (SIG-B), and the like within a PPDU by which some necessary information about PHY Service Data Unit (PSDU) attributes are communicated. The descriptions below, for sake of completeness and brevity, refer to OFDM-based 802.11 technology. Unless otherwise indicated, a station refers to a non-AP STA.

Figure 4:
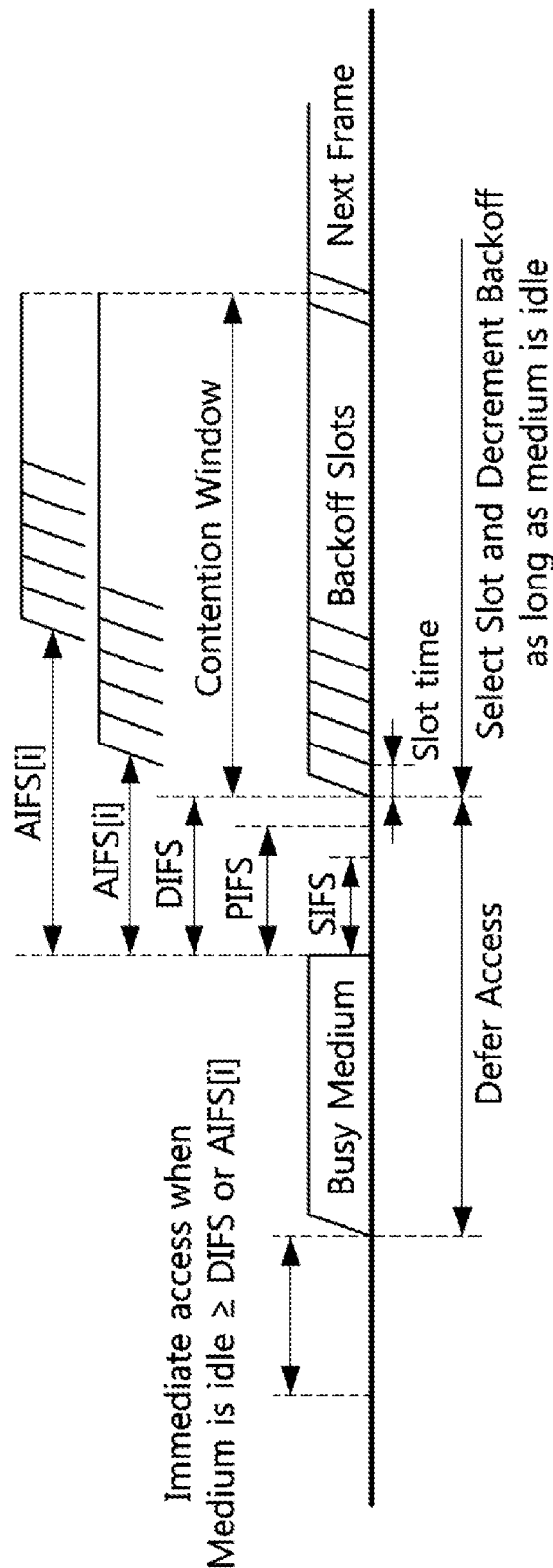
FIG. 4 illustrates Inter-Frame Space (IFS) relationships, in accordance with some embodiments of the present disclosure.

FIG. 4 illustrates Inter-Frame Space (IFS) relationships. In particular, FIG. 4 illustrates a Short IFS (SIFS), a Point Coordination Function (PCF) IFS (PIFS), a Distributed Coordination Function (DCF) IFS (DIFS), and an Arbitration IFSs corresponding to an Access Category (AC) 'i' (AIFS[i]). FIG. 4 also illustrates a slot time and a data frame is used for transmission of data forwarded to a higher layer. As shown, a WLAN device 104 transmits the data frame after performing backoff if a DIFS has elapsed during which the medium has been idle.

A management frame may be used for exchanging management information, which is not forwarded to the higher layer. Subtype frames of the management frame include a beacon frame, an association request/response frame, a probe request/response frame, and an authentication request/response frame.

A control frame may be used for controlling access to the medium. Subtype frames of the control frame include a request to send (RTS) frame, a clear to send (CTS) frame, and an acknowledgement (ACK) frame.

When the control frame is not a response frame of another frame, the WLAN device 104 transmits the control frame after performing backoff if a DIFS has elapsed during which the medium has been idle. When the control frame is the response frame of another frame, the WLAN device 104 transmits the control frame after a SIFS has elapsed without performing backoff or checking whether the medium is idle.

A WLAN device 104 that supports Quality of Service (QoS) functionality (that is, a QoS STA) may transmit the frame after performing backoff if an AIFS for an associated access category (AC) (i.e., AIFS[AC]) has elapsed. When transmitted by the QoS STA, any of the data frame, the management frame, and the control frame, which is not the response frame, may use the AIFS[AC] of the AC of the transmitted frame.

A WLAN device 104 may perform a backoff procedure when the WLAN device 104 that is ready to transfer a frame finds the medium busy. The backoff procedure includes determining a random backoff time composed of N backoff slots, where each backoff slot has a duration equal to a slot time and N being an integer number greater than or equal to zero. The backoff time may be determined according to a length of a Contention Window (CW). In an embodiment, the backoff time may be determined according to an AC of the frame. All backoff slots occur following a DIFS or Extended IFS (EIFS) period during which the medium is determined to be idle for the duration of the period.

When the WLAN device 104 detects no medium activity for the duration of a particular backoff slot, the backoff procedure shall decrement the backoff time by the slot time. When the WLAN device 104 determines that the medium is busy during a backoff slot, the backoff procedure is suspended until the medium is again determined to be idle for the duration of a DIFS or EIFS period. The WLAN device 104 may perform transmission or retransmission of the frame when the backoff timer reaches zero.

The backoff procedure operates so that when multiple WLAN devices 104 are deferring and execute the backoff procedure, each WLAN device 104 may select a backoff time using a random function and the WLAN device 104 that selects the smallest backoff time may win the contention, reducing the probability of a collision.

Figure 5:
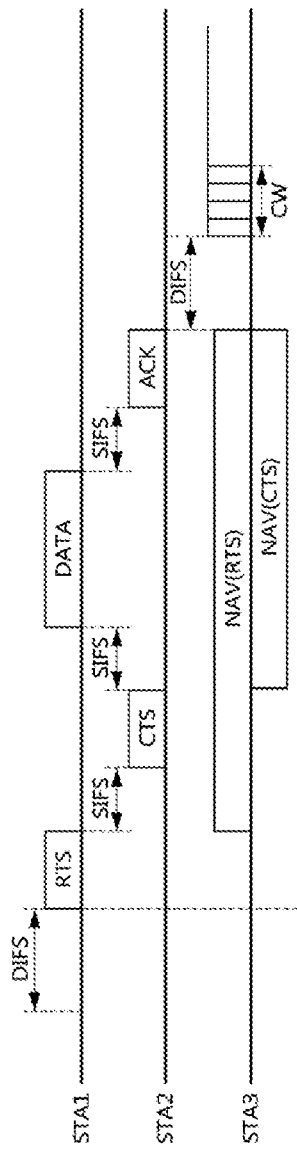
FIG. 5 illustrates a Carrier Sense Multiple Access/Collision Avoidance (CSMA/CA) based frame transmission procedure, in accordance with some embodiments of the present disclosure.

FIG. 5 illustrates a Carrier Sense Multiple Access/Collision Avoidance (CSMA/CA) based frame transmission procedure for avoiding collision between frames in a channel according to an embodiment. FIG. 5 shows a first station STA1 transmitting data, a second station STA2 receiving the data, and a third station STA3 that may be located in an area where a frame transmitted from the STA1 can be received, a frame transmitted from the second station STA2 can be received, or both can be received. The stations STA1, STA2, and STA3 may be WLAN devices 104 of FIG. 1.

The station STA1 may determine whether the channel is busy by carrier sensing. The station STA1 may determine channel occupation/status based on an energy level in the channel or an autocorrelation of signals in the channel, or may determine the channel occupation by using a network allocation vector (NAV) timer.

After determining that the channel is not used by other devices (that is, that the channel is IDLE) during a DIFS (and performing backoff if required), the station STA1 may transmit a Request-To-Send (RTS) frame to the station STA2. Upon receiving the RTS frame, after a SIFS the station STA2 may transmit a Clear-To-Send (CTS) frame as a response to the RTS frame. If Dual-CTS is enabled and the station STA2 is an AP, the AP may send two CTS frames in response to the RTS frame (e.g., a first CTS frame in a non-High Throughput format and a second CTS frame in the HT format).

When the station STA3 receives the RTS frame, it may set a NAV timer of the station STA3 for a transmission duration of subsequently transmitted frames (for example, a duration of SIFS+CTS frame duration+SIFS+data frame duration+ SIFS+ACK frame duration) using duration information included in the RTS frame. When the station STA3 receives the CTS frame, it may set the NAV timer of the station STA3 for a transmission duration of subsequently transmitted frames using duration information included in the CTS frame. Upon receiving a new frame before the NAV timer expires, the station STA3 may update the NAV timer of the station STA3 by using duration information included in the new frame. The station STA3 does not attempt to access the channel until the NAV timer expires.

When the station STA1 receives the CTS frame from the station STA2, it may transmit a data frame to the station STA2 after a SIFS period elapses from a time when the CTS frame has been completely received. Upon successfully receiving the data frame, the station STA2 may transmit an ACK frame as a response to the data frame after a SIFS period elapses.

When the NAV timer expires, the third station STA3 may determine whether the channel is busy using the carrier sensing. Upon determining that the channel is not used by other devices during a DIFS period after the NAV timer has expired, the station STA3 may attempt to access the channel after a contention window elapses according to a backoff process.

When Dual-CTS is enabled, a station that has obtained a transmission opportunity (TXOP) and that has no data to transmit may transmit a CF-End frame to cut short the TXOP. An AP receiving a CF-End frame having a Basic Service Set Identifier (BSSID) of the AP as a destination address may respond by transmitting two more CF-End frames: a first CF-End frame using Space Time Block Coding (STBC) and a second CF-End frame using non-STBC. A station receiving a CF-End frame resets its NAV timer to 0 at the end of the PPDU containing the CF-End frame. FIG. 5 shows the station STA2 transmitting an ACK frame to acknowledge the successful reception of a frame by the recipient.

As mentioned above, the IEEE 802.11ah Task Group has developed an amendment to the 802.11 standard targeting the Internet of Things (IoT) application and extended range (ER) applications by defining sub-1-GHz (S1G) license-exempt operation. IoT is considered the next major growth area for the wireless industry of home appliances and industrial automation, asset tracking, healthcare, energy management, and wearable devices. IoT devices are typically powered by a small battery and require low power consumption.

Although S1G bands have more limited frequency spectrum available than 2.4 and 5 GHz ISM bands, the basic assumption is it would be sufficient enough for low data rate applications such as IoT applications. IoT applications typically transmit small amounts of data infrequently. Moreover, since the 915 MHz ISM band (902-928 MHz) has 8.5 dB less free space propagation loss than 2.4 GHz ISM band, this could allow to enhance either the link budget between devices or long-range transmission for outdoor circumstances. Those properties can help reduce energy consumption of a device by lowering transmit power as well.

FIG. 6 shows a table listing various characteristics of 802.11ah, according to some embodiments. Even though the IEEE 802.11ah standard provides power saving features for IoT networks, some application areas such as sensor networks require ultra-low power operation to further extend network lifetime (operation time). In order to support ultra-low power operation, an addition transmission scheme, which consumes with very low power, can be employed in addition to the standard IEEE 802.11ah transmission scheme. One such transmission scheme is an on-off keying (OOK) scheme with narrow bandwidth. An OOK signal can be demodulated with non-coherent detection with simple timing synchronization. Instead of using a complicated channel coding approach, a repetition (or spreading) scheme can be used to obtain the same communication range as the lowest modulation and coding scheme (MCS) of IEEE 802.11ah. The concept of a low-power wake-up receiver has been discussed in the standardization efforts of IEEE 802.11. In this concept, the communications subsystems include a main radio (e.g., IEEE 802.11ah) and a low-power wake-up receiver (also referred to simply as a "wake-up receiver" or "WUR"). The wake-up receiver may operate in the sub-1 GHz band (instead of the 2.4 GHz and 5 GHz bands).

In this concept, the main radio (e.g., IEEE 802.11ah) is used for user data transmission and reception. The main radio is turned off unless there is data for it to transmit or receive. The wake-up receiver wakes up the main radio if it receives a wake-up signal from an AP and there is data for the main radio to receive. Once the wake-up receiver wakes up the main radio, user data is transmitted and received by the main radio. The wake-up receiver is not used for user data transmission/reception in general but serves as a "wake-up" receiver for the main radio. For this purpose, the wake-up receiver may be a relatively simple receiver. Also, the wake-up receiver may be active while the main radio is turned off. The design of the wake-up receiver may be simple such that its target power consumption is much lower than that of the main radio (e.g., the target power consumption may be less than 100 uW when active). To achieve this goal, the wake-up receiver may use simple modulation schemes such as OOK with repetition (or spreading) schemes instead of complicated modulation schemes that require coherent detection and channel coding schemes.

FIG. 7 is a diagram showing operational examples of a low-power wake-up receiver when there is data to receive and when there is no data to receive, according to some embodiments. As shown in the diagram, when there is no data to receive, the wake-up receiver 740 of the STA 720 is active (it is turned "ON") while the main radio 730 (e.g., an 802.11ah radio) of the STA 720 is turned off (it is turned "OFF") or in a low-power state. This is an example where the STA 720 is in a power-save mode to reduce power consumption. However, when the AP 710 has data 750 to send to the STA 720, the AP may first send a wake-up signal in the form of a wake-up packet (WUP) 760 which is transmitted using a new waveform such as OOK. The wake-up receiver 740 of the STA 720 may receive this wake-up packet 760. Responsive to receiving this wake-up packet 760, the wake-up receiver 740 of the STA 720 may wake up the main radio 730 of the STA 720 (turn the main radio 730 on) so that the main radio 730 becomes active. After the main radio 730 of the STA is active, the AP may send data 750 to the STA (e.g., using 802.11ah), which is received by the main radio 730 of the STA 720. The STA 720 is said to be in an active mode when its main radio 730 is active.

Embodiments are described herein that efficiently manage power consumption and channel resource usage of a wireless device equipped with a wake-up receiver by making use of the transition delay of the wireless device to transition a main radio from a doze state to an awake state after receiving a wake-up signal. The transition delay may include the delay to activate a radio frequency (RF) and/or baseband component (e.g., including hardware logic implemented in these components) and the delay to prepare a program for execution on a central processing unit (CPU). According to an embodiment, when a wireless device successfully receives a wake-up signal, the wireless device transmits a response frame as a response to the wake-up signal before the transition delay has elapsed. Also, according to an embodiment, when a wake-up signal is transmitted to a group of wireless devices, channel resources are efficiently used by designating one of the wireless devices from the group as a representative of the group for responding to a wake-up signal. Embodiments are described in further detail herein.

Various features and formats are described herein in the context of 802.11 standards using terminology of 802.11 standards. Certain details (e.g., the details of certain fields/subfields and their purpose) that are not necessary for the understanding of embodiments are omitted herein for sake of conciseness and to avoid obscuring the description.

In some WLAN systems, when there is no data to exchange between an AP and a STA, the STA that supports power save mode transitions to a doze state to reduce power consumption of the STA. The STA may periodically transition to an awake state to check whether there is a packet to be received according to a beacon listen interval that was agreed upon when the STA established a connection with the AP. The STA may transition to the awake state at the time the AP is expected to transmit a beacon frame. A considerable amount of time and power is consumed until the STA transitions to the awake state. As mentioned above, the concept of a wake-up receiver has been introduced as a solution to reduce the power consumption of a STA that requires low-power operation. The STA may use its wake-up receiver to determine whether it needs to wake up without having to activate the entire wireless system (e.g., without having to activate its main radio).

A main wireless communication system may be divided into a RF/baseband component, which manages wireless communications, and a CPU and program component that operates by loading code for execution on the CPU. It takes some time to activate the RF/baseband from the doze state to the awake state, and it also takes some time to load and prepare the program in memory for execution by the CPU (e.g., to load protocol of certain wireless specification, essential component of entire system operation, network stack, etc.). All operations that are needed to prepare the program may be referred to herein as "bootup". In order for the wireless communication system to perform transmission/reception operations normally, all of these preparation steps should be completed.

Figure 8:
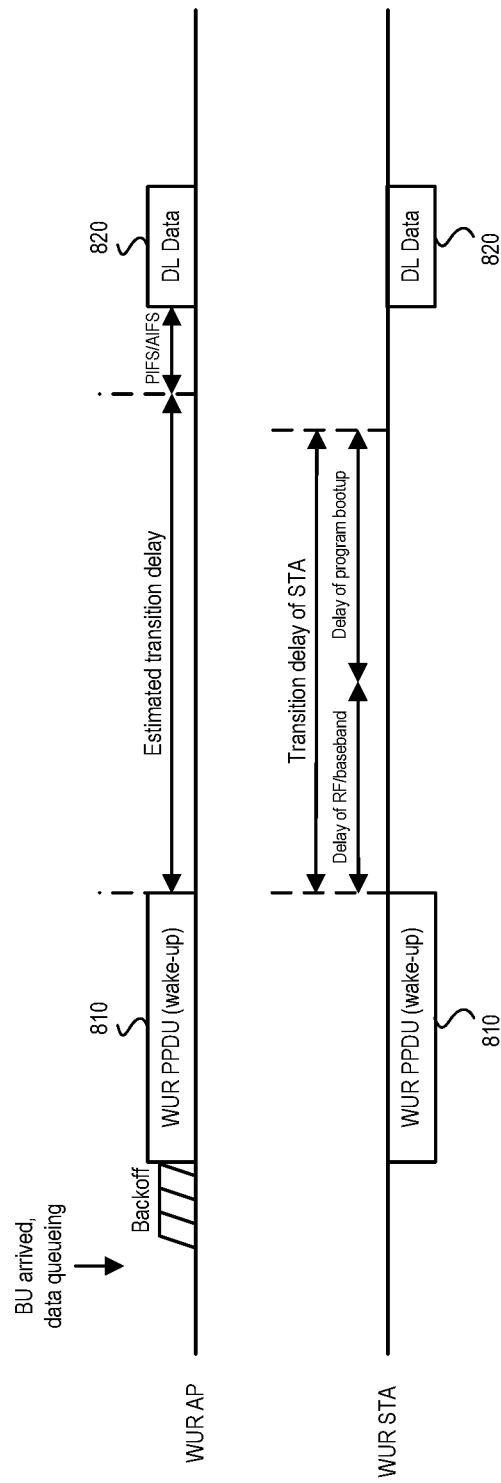
FIG. 8 is a diagram showing a frame exchange sequence when a STA equipped with a wake-up receiver receives a wake-up receiver physical layer protocol data unit (PPDU) requesting the STA to wake up, according to some embodiments.

FIG. 8 is a diagram showing a frame exchange sequence when a STA equipped with a wake-up receiver (a WUR STA) receives a wake-up receiver PPDU requesting the STA to wake up, according to some embodiments. As shown in the diagram, after performing a backoff process, an AP that is capable of transmitting wake-up signals (a "WUR AP") may transmit a wake-up receiver physical layer protocol data unit (PPDU) 810 to a STA that is equipped with a wake-up receiver (a "WUR STA") to request that the STA wake up. The STA that receives the wake-up receiver PPDU 810 (through its wake-up receiver) may cause its main radio to transition from a doze state to an awake state in response to receiving the wake-up receiver PPDU 810. A transition delay is involved to transition the main radio from a doze state to an awake state. This transition delay may include two main parts: (1) a RF/baseband delay and (2) a bootup delay. The AP that transmitted the wake-up signal (the wake-up receiver PPDU 810) may predict/estimate the time that it should wait before transmitting downlink data 820 to the STA by adding a margin to the transition delay. The AP may know the transition delay of the STA based on exchanging information with the STA in advance. The AP may transmit a downlink data frame 820 after waiting for the estimated transition delay and after xIFS (e.g., PIFS/AIFS) time has elapsed.

A wake-up receiver may be implemented in, connected to, or attached to a wireless device that needs to perform low-power operations. The wireless device that transmits a signal that can be received by a wake-up receiver may be a wireless device that performs low-power operation, but is typically an AP STA or other type of base station that does not require low-power operation.

Figure 9:
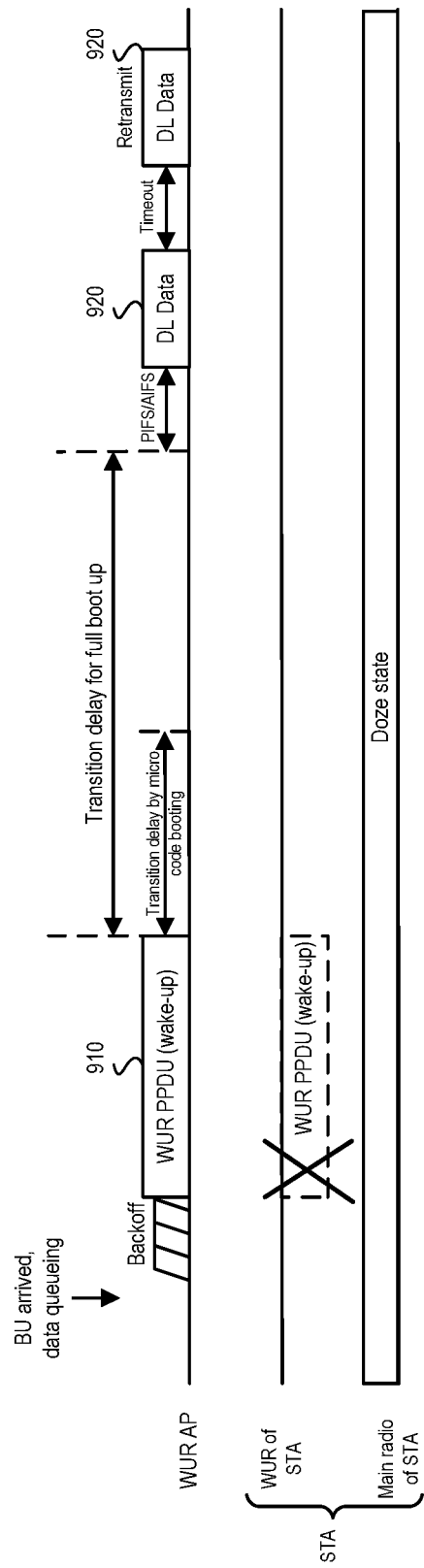
FIG. 9 is a diagram showing a frame exchange sequence where a wake-up signal is missed, according to some embodiments.

An AP STA may transmit a wake-up signal unilaterally to a low-power STA equipped with a wake-up receiver. In general, a STA that has received the wake-up signal completes its transition to a state in which the STA can transmit a wireless signal only after passing through both an RF/baseband delay and a program bootup delay for preparing a program for execution. Typically, the time it takes to complete bootup operations is long enough to exchange several frames. It may be inefficient for the STA that has received a wake-up signal to transmit a response frame indicating that the STA has transitioned to the awake state after all this time has passed. Additionally, in a case where the STA transmits a response to the wake-up signal, the valid data that the AP transmits to the STA after receiving the response is further delayed, resulting in increased data latency. Furthermore, from the AP's point of view, transmitting the valid data using the main radio without receiving a response from the STA may also lead to a waste of channel resources. This is because the STA equipped with the wake-up receiver may not have woken up properly. For example, if the STA does not properly receive the wake-up signal, the AP waits for the STA's main radio to wake up, resulting in an unnecessary waiting time. During this time, the AP may unnecessarily wait or meaninglessly transmit or retransmit data to the STA while the STA is in a doze state even though there is sufficient time to transmit data to other STAs within the BSS. FIG. 9 is a diagram showing the situation described above.

FIG. 9 is a diagram showing a frame exchange sequence where a wake-up signal is missed, according to some embodiments. In the example shown in the diagram, although a WUR AP has transmitted a wake-up receiver PPDU 910 to a STA as a wake-up signal, the wake-up receiver of a STA fails to properly receive it. Thus, the main radio of the STA does not transition to the awake state but stays in the doze state.

The AP that transmitted the wake-up receiver PPDU 910 transmits a downlink (DL) data frame 920 to the STA after a time corresponding to the known/estimated transition delay of the STA has elapsed. Although the AP transmitted the downlink data frame 920 to the STA thinking that the STA properly received the previously transmitted wake-up receiver PPDU 910, since the STA actually failed to properly receive the wake-up receiver PPDU 910, the STA does not respond to the downlink data frame 920 (since the STA's main radio did not wake up and is still in a doze state), and thus the AP does not receive a response to the downlink data frame 920 from the STA. The AP may attempt to retransmit the downlink data frame 920 according to MAC protocols (e.g., after applying rate adaptation) to no avail. If such an unnecessary sequence is repeated, an opportunity for the AP to transmit to other STAs or the transmission opportunities of the other STAs are lost, so that channel resources are not used efficiently.

In order to prevent such situations from occurring, a STA or a group of STAs which receives a wake-up signal may transmit a response to the wake-up signal indicating that the wake-up signal has been successfully received and that the STA or the group of STAs has successfully woken up. However, there may be a delay until the STA is able to transmit the response due to the transition delay required for full bootup of the program for execution by the CPU.

To solve the above-mentioned problem, a method of transmitting a response signal to a wake-up signal using only simple logic without waiting until the full bootup has been completed is described herein. In order for a wireless device to transmit a response signal, the RF/baseband component of the wireless device should be sufficiently stabilized to perform a transmission. In addition, the MAC protocol should be sufficiently activated to generate the response. The MAC protocol to perform such a simple operation may be implemented as hardware logic or may be implemented through microcode that can be operated with a minimum setting in the CPU in advance. The delay required to transmit such a simple response is referred to herein as a "transition delay of responding receiver."

Figure 10:
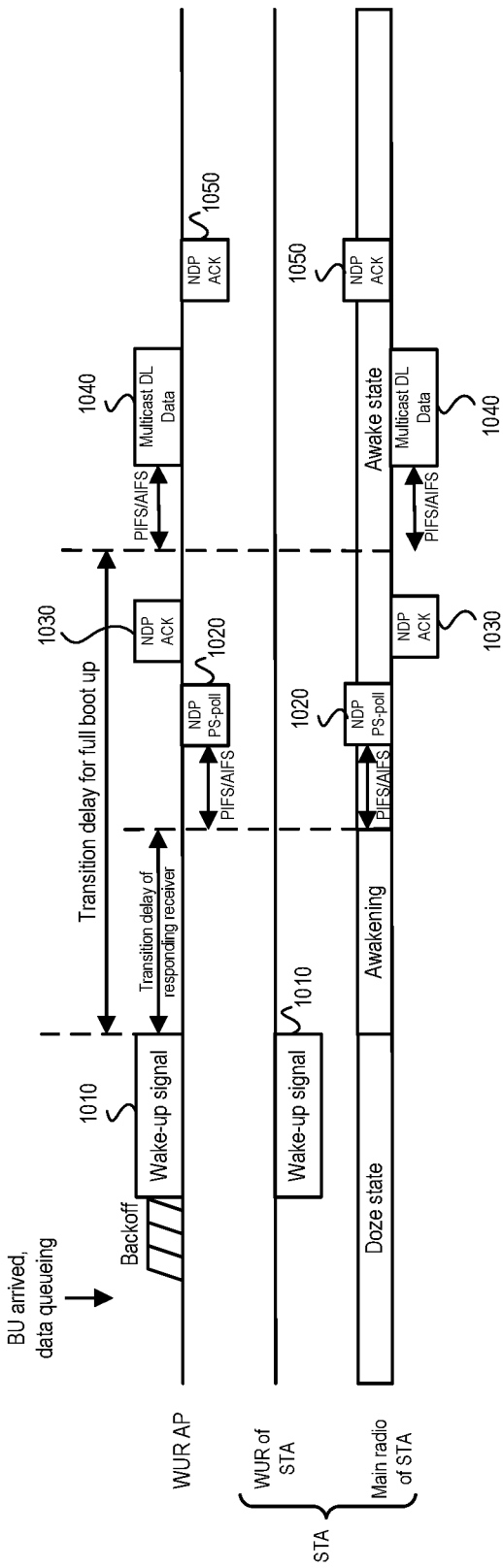
FIG. 10 is a diagram showing a frame exchange sequence where a response to a wake-up signal is transmitted before an estimated full transition delay has elapsed, according to some embodiments.

FIG. 10 is a diagram showing a frame exchange sequence where a response to a wake-up signal is transmitted before an estimated full transition delay has elapsed, according to some embodiments. In the example shown in the diagram, it is assumed that 802.11ah technology of WLAN is used. As shown in the diagram, after performing a backoff process, an AP transmits a wake-up signal 1010 (e.g., a wake-up receiver PPDU) to a STA. Then, the AP waits for at least the known/estimated transition delay for full bootup of a STA. In the example shown in the diagram, the AP receives a NDP PS-Poll frame 1020 from the STA after a delay that is sufficient to receive a response (after the transition delay of responding receiver of the STA). The AP may respond to the NDP PS-Poll frame 1020 with an NDP ACK frame 1030 to acknowledge the NDP PS-Poll frame 1020. Since a basic RF/baseband function and a simple MAC protocol are activated in the STA, the STA may perform processing up to reception of the NDP ACK frame 1030. However, at this point, the STA is not able to receive and process a frame such as the downlink data frame 1040, as this requires protocol processing through several stacks. The STA may only be able to process the downlink data frame 1040 after completing a full bootup. Since the AP knows a delay required for the STA to complete the full bootup, the AP may transmit the downlink data frame 1040 to the STA after the transition delay for full bootup has elapsed if the AP is able to confirm that the STA has woken up by receiving a response frame (the NDP PS-poll frame 1020). The downlink data frame 1040 may be a unicast, multicast, or broadcast frame. In the example shown in the diagram, the downlink data frame 1040 is a multicast frame. As shown in the diagram, if the STA transmits a short frame (e.g., a NDP PS-Poll frame 1020) corresponding to the length of the legacy preamble (e.g., with no payload), it is possible for the STA to inform the AP that the STA has properly received the wake-up signal 1010 and has woken up while reducing channel occupation. In the example shown in the diagram, a NDP PS-Poll frame 1020 is used as the response frame but other types of frames can be used as the response frame. The NDP PS-Poll frame is a frame defined in the WLAN S1G specification and can also indicate whether the STA has uplink traffic. The STA may transmit a NDP acknowledgement frame 1050 to the AP (through the main radio) if it properly receives the downlink data frame 1040.

Thus, using the techniques described above, the AP may transmit a wake-up signal 1010 to the wake-up receiver of the STA and determine whether the STA properly received the wake-up signal 1010 before the entire system of the STA is activated. Although the use of this technique increases the complexity of the STA-side operations, the channel usage efficiency of the entire wireless network can be improved. Additionally, if the AP and the STA support a S1G bidirectional protocol, the downlink data frame of the AP and the uplink data frame of the STA may be exchanged quickly without a separate additional backoff process within the TXOP to further improve efficiency.

An advantage of embodiments described herein is that they efficiently use channel resources (reduce waste of channel resources) in a wireless network that uses wake-up receivers by speeding up a response to successful wake-up signal reception.

Figure 11:
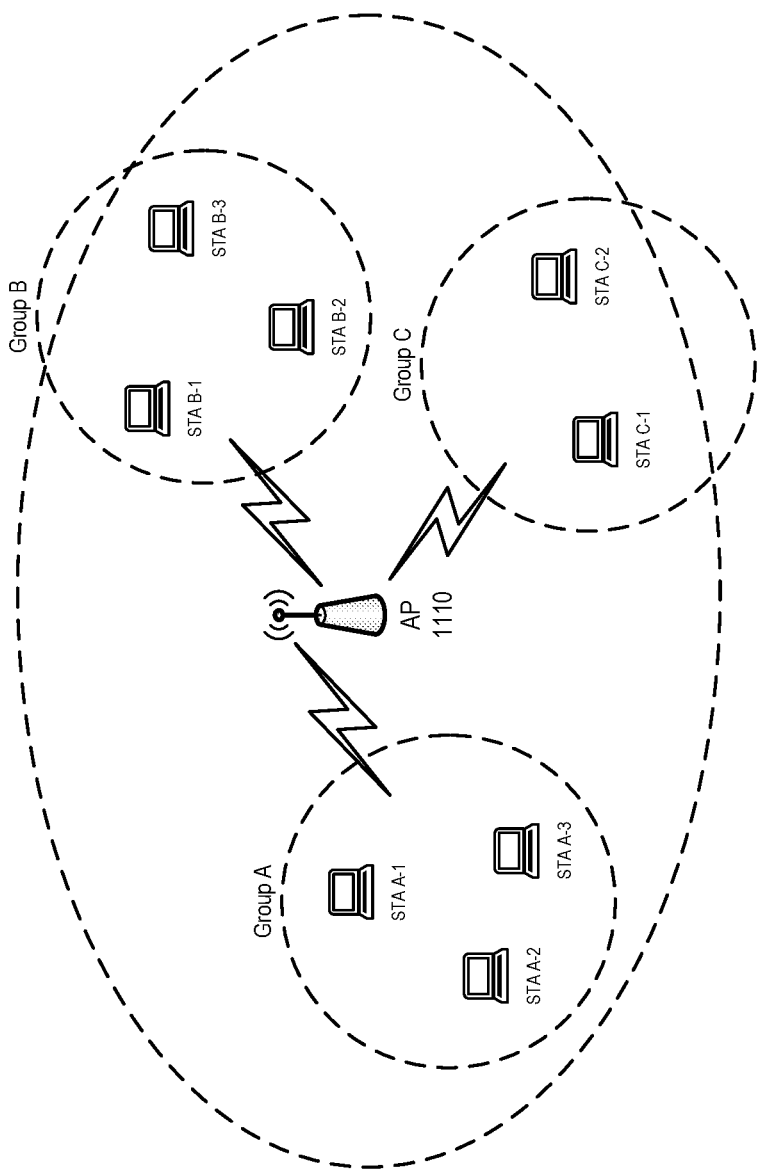
FIG. 11 is a diagram showing a network topology of groups of STAs, according to some embodiments.

FIG. 11 is a diagram showing a network topology of groups of STAs, according to some embodiments. As shown in the diagram, the network topology includes an AP 1110, STAs A-1, A-2, and A-3, which are members of group A, STAs B-1, B-2, and B-3, which are members of group B, and STAs C-1 and C-2, which are members of group C. A scenario in which an AP wakes up a single STA has been described above. However, it is possible for the AP to wake up a group of STAs. For example, the AP 1110 may attempt to wake up the STAs that are members of group A (i.e., STAs A-1, A-2 and A-3). When the AP 1110 transmits a wake-up signal to the STAs as a multicast frame, the STAs that have their wake-up receivers turned on can receive the wake-up signal and determine that the wake-up signal is for waking up the group to which they belong.

Figure 12:
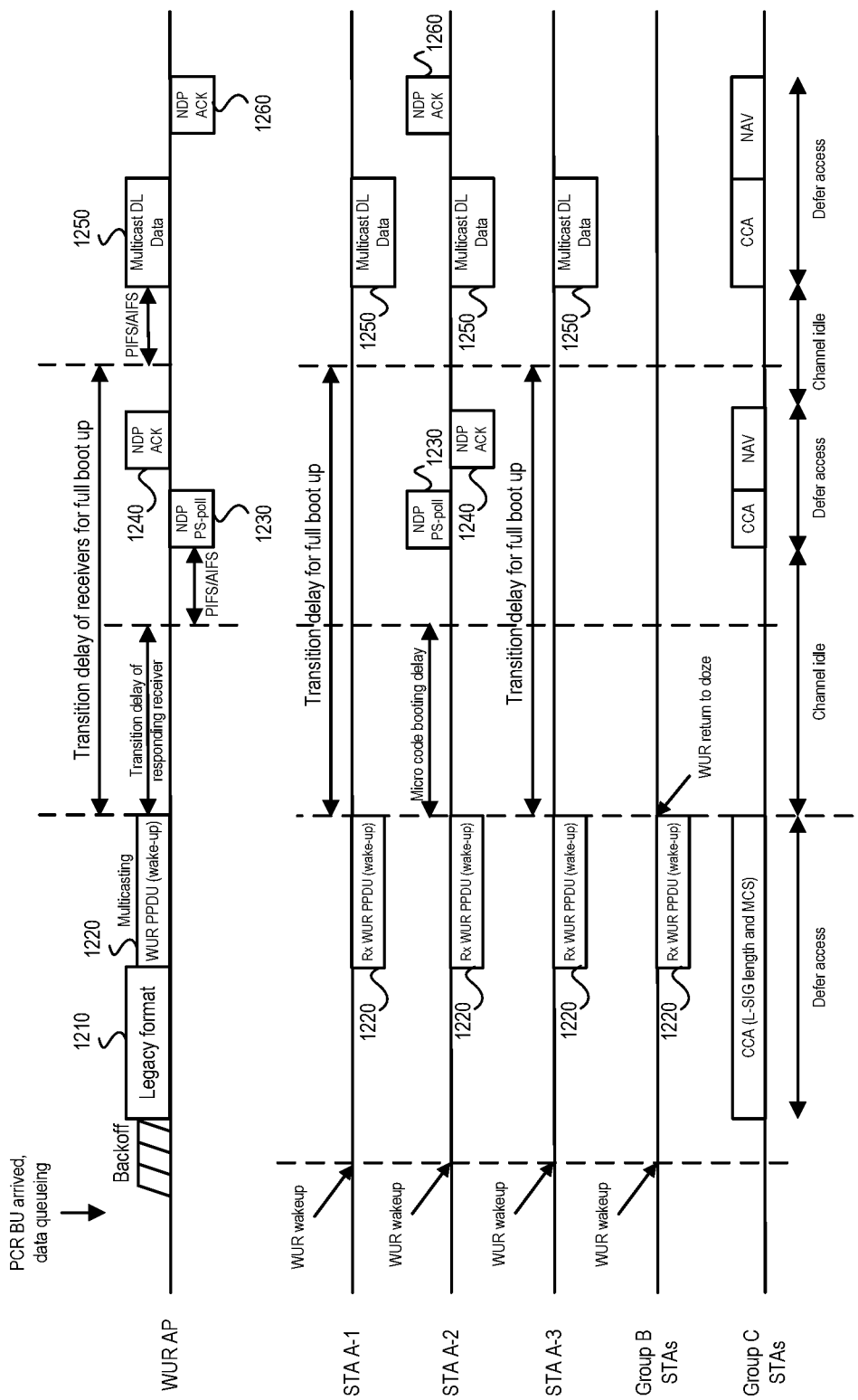
FIG. 12 is a diagram showing a frame exchange sequence for waking up a group of STAs, according to some embodiments.

FIG. 12 is a diagram showing a frame exchange sequence for waking up a group of STAs, according to some embodiments. A WUR AP may transmit a wake-up signal using only a wake-up receiver PPDU 1220 or may transmit the wake-up signal by transmitting the wake-up receiver PPDU 1220 subsequent to transmitting a legacy format portion 1210 (the legacy format portion and the wake-up receiver PPDU 1220 may be regarded as a single PHY PPDU). Prepending the legacy format portion 1210 to the wake-up receiver PPDU 1220 may help to protect legacy STAs that cannot interpret the wake-up receiver PPDU 1220. In the example shown in the diagram, the STAs that are members of group C (i.e., STA C-1 and STA C-2) are assumed to be legacy STAs. As shown in the diagram, these STAs defer channel access in response to receiving the legacy format portion 1210.

In the example shown in the diagram, it is assumed that the STAs that are members of group B are equipped with wake-up receivers. When the AP transmits the wake-up signal to group A, the STAs that are members of group B and that are within the receiving radius of the transmission recognize that the wake-up signal is not a signal to wake up its own group, and thus transition their wake-up receivers to a doze state. That is, both the main radio and the wake-up receiver stay in the doze state to save power. Thereafter, the group B STAs may wait for another wake-up signal by periodically waking up their wake-up receivers at scheduled times/intervals.

In the example shown in the diagram, it is assumed that the STAs that are members of group A are equipped with wake-up receivers. When the AP transmits the wake-up signal to group A, the group A STAs that receive the wake-up signal transmitted to their group also need to inform the AP that the wake-up signal has been properly received. If these STAs operate as described above with regard to FIG. 10, a collision may occur between NDP frames transmitted by the STAs. Thus, it is appropriate that only one STA from the group transmit a response to the wake-up signal as a representative of the group.

For example, in the example shown in the diagram, STA A-2 acts as the representative of group A and thus transmits the NDP PS-Poll frame 1230 to the AP as a response to the wake-up signal. The AP may then transmit an NDP ACK frame 1240 to STA A-2 to acknowledge the NDP PS-Poll frame 1230. After the transition delay of receivers to perform full bootup has elapsed (after transmitting the wake-up receiver PPDU 1220), the AP may transmit a (multicast) downlink data frame 1250 to the group A STAs. STA A-2 may then transmit a NDP ACK frame 1260 to the AP to acknowledge the downlink data frame 1250 as the representative of group A.

In an embodiment, one or more of the STAs in a group can be designated as being a representative of the group for responding to the wake-up signal. In an embodiment, the AP may choose which STA is the representative STA. In an embodiment, the AP indicates which STA is the representative STA in the wake-up signal (e.g., in the wake-up receiver PPDU 1220). An example format of the wake-up receiver PPDU 1220 is shown in FIG. 13.

Figure 13:
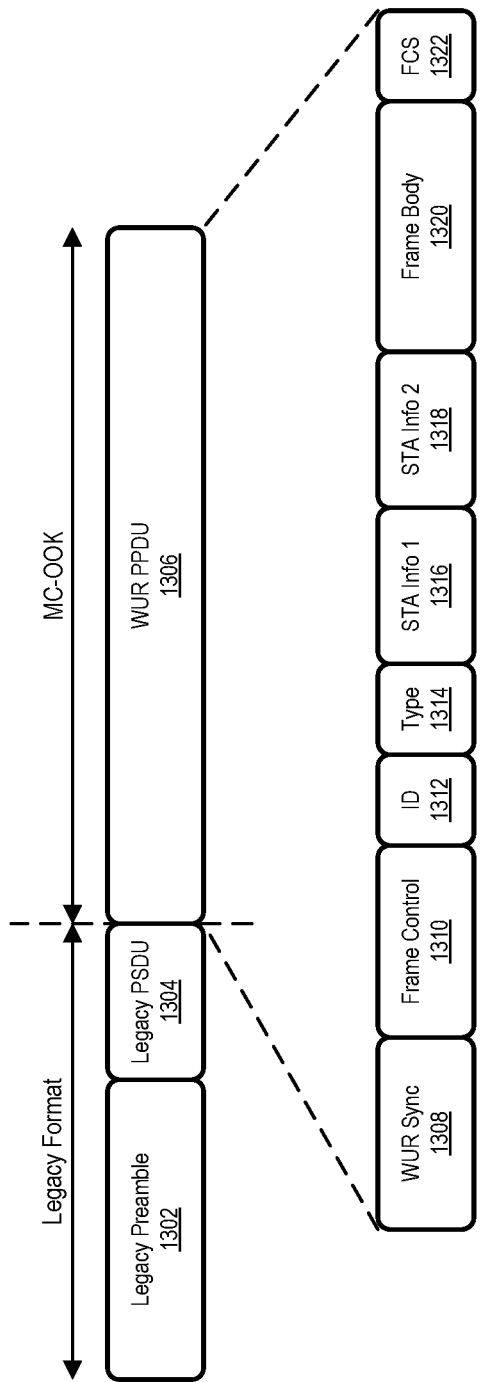
FIG. 13 is a diagram showing an example format of a group addressed wake-up receiver PPDU, according to some embodiments.

FIG. 13 is a diagram showing an example format of a group addressed wake-up receiver PPDU, according to some embodiments. As shown in the diagram, the wake-up receiver PPDU 1306 includes a WUR sync field 1308, a frame control field 1310, an ID field 1312, a type field 1314, a STA info 1 field 1316, a STA info 2 field 1318, a frame body field 1320, and a frame check sequence (FCS) field 1322. Also, as shown in the diagram, a legacy preamble 1302 and a legacy PSDU 1304 are prepended to the wake-up receiver PPDU 1306. The wake-up receiver PPDU 1306 may be transmitted using a comparatively simpler transmission scheme compared to the legacy preamble 1302 and the legacy PSDU 1304. For example, the wake-up receiver PPDU 1306 may be transmitted using a MC-OOK (multi-carrier on off keying) transmission scheme.

In an embodiment, the ID field 1312 is used to indicate a group address (e.g., a group identifier). The group of STAs that receive the wake-up receiver PPDU 1306 can determine that the wake-up receiver PPDU 1306 is intended for the group to which it belongs based on the ID field 1312. In an embodiment, one of the STA info fields (e.g., STA info 1 field 1316) is used to indicate the STA ID of the STA that is to be the representative of the group for responding to the group addressed wake-up receiver PPDU 1306. A STA whose ID matches the STA ID indicated by the STA info field can recognize that it is the representative of the group for responding to the wake-up receiver PPDU 1306, and thus transmit a response to the wake-up receiver PPDU 1306 without collision. An advantage of designating the representative/responding STA in this manner is that it allows the AP to determine, with a certain level of confidence, that the group addressed wake-up receiver PPDU 1306 has been properly received by the group of STAs. Further, since all of the STAs do not need to transmit responses sequentially, channel efficiency is increased.

An AP may transmit a multicast/broadcast downlink data frame to a group of STAs after transmitting the wake-up receiver PPDU 1306 (e.g., if the AP received a response to the wake-up receiver PPDU 1306 from one of the STAs). In general, a response frame is not sent after receiving a multicast or broadcast transmission. However, if successful reception of multicast/broadcast downlink data is informed, the efficiency of the WLAN system and the channel efficiency can be improved. In an embodiment, the wake-up receiver PPDU 1306 indicates one of the STAs from the group of STAs as being a representative of the group for acknowledging the downlink data frame. For example, in the format shown in FIG. 13, the STA Info 1 field 1316 may be used to indicate the STA ID of the STA that is the representative of the group for responding to the wake-up receiver PPDU 1306 and the STA Info 2 field 1318 may be used to indicate the STA ID of the STA that is the representative of the group for acknowledging the downlink data frame. In an embodiment, the same STA is chosen to be the representative for responding to the wake-up receiver PPDU 1306 and for acknowledging the downlink data frame. For example, in the example shown in FIG. 12, STA A-2 is chosen as the representative for responding to the wake-up receiver PPDU 1220 and for acknowledging the downlink data frame 1250, and thus transmits both the response to the wake-up signal 1220 (NDP PS-Poll frame 1230) and the acknowledgement of the downlink data frame 1250 (NDP ACK frame 1260). In an embodiment, different STAs are chosen to be representatives for responding to the wake-up signal and for acknowledging the downlink data frame, respectively. This diversification of STAs may provide a more reliable protocol execution.

An advantage of embodiments described herein is that they efficiently use channel resources (reduce waste of channel resources) by designating a representative for responding to a wake-up signal and/or acknowledging a downlink data frame when an AP attempts to wake up a group of STAs.

Figure 14:
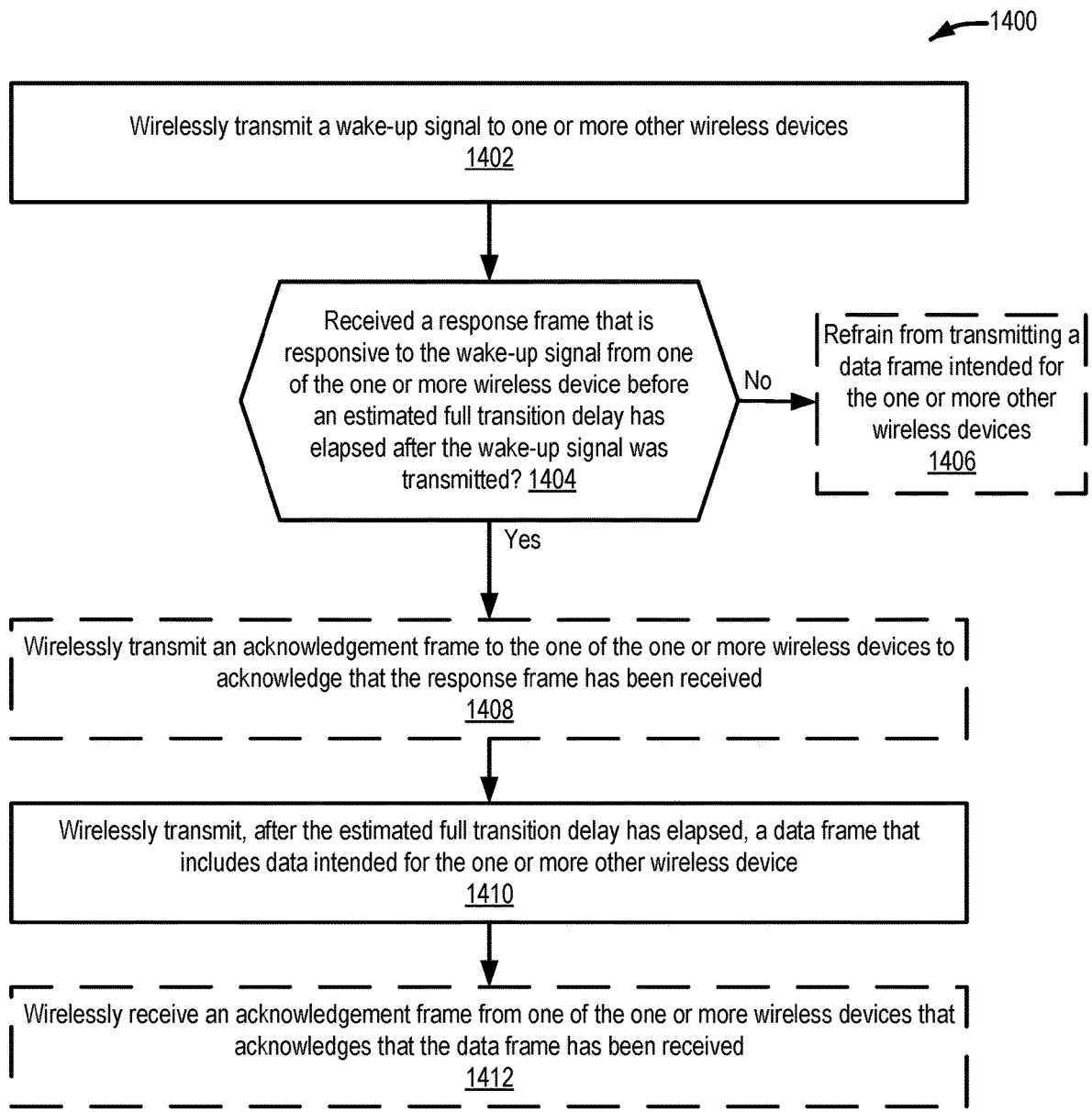
FIG. 14 is a diagram showing a method for wirelessly transmitting a wake-up signal and data frame to one or more wireless devices, according to some embodiments.

Turning now to FIG. 14, a method 1400 will now be described for wirelessly transmitting a wake-up signal and data frame to one or more wireless devices, in accordance with some embodiments. The method 1400 may be performed by one or more devices described herein. For example, the method 1400 may be performed by a wireless device 104 functioning as an AP in a wireless network.

Although shown in a particular order, in some embodiments the operations of the method 1400 (and the other methods shown in the other figures) may be performed in a different order. For example, although the operations of the method 1400 are shown in a sequential order, some of the operations may be performed in partially or entirely overlapping time periods.

As shown in FIG. 14, the method 1400 may commence at operation 1402 with the wireless device wirelessly transmitting a wake-up signal to one or more other wireless devices. In an embodiment, the one or more other wireless devices includes a plurality of wireless devices that are members of a same group, wherein the wake-up signal includes an ID field that indicates an identifier of the group. In an embodiment, the wake-up signal includes a first STA ID field that indicates a particular wireless device from the group as being a representative of the group for responding to the wake-up signal. Additionally or alternatively, in an embodiment, the wake-up signal includes a second STA ID field that indicates a particular wireless device from the group as being a representative of the group for acknowledging the data frame. In an embodiment, the particular wireless device that is indicated by the first STA ID field as being the representative of the group for responding to the wake-up signal is different from the particular wireless device that is indicated by the second STA ID field as being the representative of the group for acknowledging the data frame (but it is also possible that they are the same wireless device).

At operation 1404, the wireless device determines whether it has received a response frame that is responsive to the wake-up signal from one of the one or more wireless devices before an estimated full transition delay has elapsed after the wake-up signal was transmitted (the estimated full transition delay may include an estimated delay to activate a radio frequency and/or baseband component and an estimated delay to load a program for execution). If not, at operation 1406, the wireless device refrains from transmitting a data frame intended for the one or more other wireless devices.

In an embodiment, if the wireless device determines that it has received the response frame, then at operation 1408, the wireless device wirelessly transmits an acknowledgement frame to the one of the one or more wireless devices to acknowledge that the response frame has been received. In an embodiment, the response frame is a null data packet power save poll (NDP PS-Poll) frame. In an embodiment, the acknowledgement frame is a NDP ACK frame.

At operation 1410, the wireless device wirelessly transmits, after the estimated full transition delay has elapsed, a data frame that includes data intended for the one or more other wireless device.

In an embodiment, at operation 1412, the wireless device wirelessly receives an acknowledgement frame from one of the one or more wireless devices that acknowledges that the data frame has been received.

Turning now to FIG. 15, a method 1500 will now be described for wirelessly receiving and processing a wake-up signal, in accordance with some embodiments. The method 1500 may be performed by one or more devices described herein. For example, the method 1500 may be performed by a wireless device 104 functioning as a non-AP STA in a wireless network.

As shown in FIG. 15, the method 1500 may commence at operation 1502 with the wireless device wirelessly receiving a wake-up signal from another wireless device (e.g., from an AP STA). In an embodiment, the wake-up signal includes an ID field that indicates an identifier of a group, wherein the wireless device is a member of the group. In an embodiment, the wake-up signal includes a first STA ID field that indicates the wireless device as being a representative of the group for responding to the wake-up signal. Additionally or alternatively, in an embodiment, the wake-up signal includes a second STA ID field that indicates the wireless device as being a representative of the group for acknowledging the data frame.

In an embodiment, at operation 1504, the wireless device determines whether the wake-up signal is a group addressed wake-up signal. If so, the method proceeds to operation 1506. Otherwise, the method proceeds to operation 1508.

In an embodiment, at operation 1506, the wireless device determines whether a first STA ID field included in the wake-up signal indicates that the wireless device is a representative of the group for responding to the wake-up signal. If so, the method proceeds to operation 1508. Otherwise, the method proceeds to operation 1510.

At operation 1508, the wireless device wirelessly transmits a response frame to the another wireless device as a response to the wake-up signal after activating a radio frequency and/or baseband component of the wireless device but before finishing loading a program for execution. In an embodiment, the response frame is a null data packet power save poll (NDP PS-Poll) frame.

At operation 1510, the wireless device wirelessly receives a data frame from the another wireless device after finishing loading the program for execution (and also after activating the radio frequency and/or baseband component).

In an embodiment, if the wake-up signal is a group wake-up signal, at operation 1512, the wireless device determines whether a second STA ID field included in the wake-up signal indicates that the wireless device is a representative of the group for acknowledging the data frame. If so, the method proceeds to operation 1516. Otherwise, the method proceeds to operation 1514, where there is no need for the wireless device to transmit an acknowledge frame for the data frame (since the wireless device is not the representative of the group for acknowledging the data frame).

In an embodiment, at operation 1516, the wireless device wirelessly transmits an acknowledgement frame to the another wireless device to acknowledge that the data frame has been received.

Although many of the solutions and techniques provided herein have been described with reference to a WLAN system, it should be understood that these solutions and techniques are also applicable to other network environments, such as cellular telecommunication networks, wired networks, etc. In some embodiments, the solutions and techniques provided herein may be or may be embodied in an article of manufacture in which a non-transitory machine-readable medium (such as microelectronic memory) has stored thereon instructions which program one or more data processing components (generically referred to here as a "processor" or "processing unit") to perform the operations described herein. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In some cases, an embodiment may be an apparatus (e.g., an AP STA, a non-AP STA, or another network or computing device) that includes one or more hardware and software logic structures for performing one or more of the operations described herein. For example, as described herein, an apparatus may include a memory unit, which stores instructions that may be executed by a hardware processor installed in the apparatus. The apparatus may also include one or more other hardware or software elements, including a network interface, a display device, etc.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system may carry out the computer-implemented methods described herein in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method performed by a wireless device, comprising:
   wirelessly transmitting a wake-up signal to one or more other wireless devices indicating an upcoming downlink data frame transmission;
   wirelessly receiving a response frame that is responsive to the wake-up signal from one of the one or more other wireless devices before an estimated full transition delay has elapsed after the wake-up signal was transmitted, wherein the estimated full transition delay is an estimated delay for a main radio to transition from being in a doze state to being in an awake state, wherein the estimated full transition delay includes an estimated delay to activate a radio frequency or baseband component and an estimated delay to load a program for execution for data frame reception, wherein the one of the one or more other wireless devices transmits the response frame via its main radio after activating a radio frequency or baseband component of its main radio but before its main radio has fully transitioned from being in the doze state to being in the awake state; and
   wirelessly transmitting, after the estimated full transition delay has elapsed, the data frame that includes data intended for the one or more other wireless device in response to a determination that the response frame has been received.

2. The method of claim 1, wherein the one or more other wireless devices includes a plurality of wireless devices that are members of a same group, wherein the wake-up signal includes an ID field that indicates an identifier of the group.

3. The method of claim 2, wherein the wake-up signal includes a first station (STA) ID field that indicates a particular wireless device from the group as being a representative of the group for responding to the wake-up signal.

4. The method of claim 3, wherein the wake-up signal further includes a second STA ID field that indicates a particular wireless device from the group as being a representative of the group for acknowledging the data frame.

5. The method of claim 4, wherein the particular wireless device that is indicated by the first STA ID field as being the representative of the group for responding to the wake-up signal is different from the particular wireless device that is indicated by the second STA ID field as being the representative of the group for acknowledging the data frame.

6. The method of claim 1, wherein the response frame is a null data packet power save poll (NDP PS-Poll) frame.

7. The method of claim 1, further comprising:
   wirelessly transmitting an acknowledgement frame to the one of the one or more other wireless devices to acknowledge that the response frame has been received, wherein the acknowledgement frame is transmitted before the estimated full transition delay has elapsed after the wake-up signal was transmitted.

8. The method of claim 1, further comprising:
   wirelessly receiving an acknowledgement frame from one of the one or more other wireless devices that acknowledges that the data frame has been received.

9. A method performed by a wireless device, comprising:
   wirelessly receiving, via a wake-up receiver of the wireless device, a wake-up signal from another wireless device indicating an upcoming downlink data frame transmission; and
   wirelessly transmitting, via a main radio of the wireless device, a response frame to the another wireless device as a response to the wake-up signal after activating a radio frequency or baseband component of the main radio but before a program for execution is completely loaded into a processor for data frame reception and thus before a full transition delay has elapsed after the wake-up signal was received for the main radio to fully transition from being in a doze state to being in an awake state.

10. The method of claim 9, further comprising:
wirelessly receiving a data frame from the another wireless device after the main radio has fully transitioned from being in the doze state to being in the awake state.

11. The method of claim 10, wherein the wake-up signal includes an ID field that indicates an identifier of a group, wherein the wireless device is a member of the group.

12. The method of claim 11, wherein the wake-up signal includes a first station (STA) ID field that indicates the wireless device as being a representative of the group for responding to the wake-up signal.

13. The method of claim 12, wherein the wake-up signal further includes a second STA ID field that indicates the wireless device as being a representative of the group for acknowledging the data frame.

14. The method of claim 13, further comprising:
wirelessly transmitting an acknowledgement frame to the another wireless device to acknowledge that the data frame has been received in response to a determination that the second STA ID field indicates the wireless device as being the representative of the group for acknowledging the data frame.

15. The method of claim 9, wherein the response frame is a null data packet power save poll (NDP PS-Poll) frame.

16. A wireless device that is to operate in a wireless network, the wireless device comprising:
a radio frequency transceiver;
a memory device storing a set of instructions; and
a processor coupled to the memory device, wherein the set of instructions when executed by the processor causes the wireless device to:
wirelessly transmit a wake-up signal to one or more other wireless devices indicating an upcoming downlink data frame transmission, wirelessly receive a response frame that is responsive to the wake-up signal from one of the one or more other wireless devices before an estimated full transition delay has elapsed after the wake-up signal was transmitted, wherein the estimated full transition delay is an estimated delay for a main radio to transition from being in a doze state to being in an awake state, wherein the estimated full transition delay includes an estimated delay to activate a radio frequency or baseband component and an estimated delay to load a program for execution for data frame reception, wherein the one of the one or more other wireless devices transmits the response frame via its main radio after activating a radio frequency or baseband component of its main radio but before its main radio has fully transitioned from being in the doze state to being in the awake state and
wirelessly transmit, after the estimated full transition delay has elapsed, the data frame that includes data intended for the one or more other wireless device in response to a determination that the response frame has been received.

17. The wireless device of claim 16, wherein the one or more other wireless devices includes a plurality of wireless devices that are members of a same group, wherein the wake-up signal includes an ID field that indicates an identifier of the group.

18. The wireless device of claim 17, wherein the wake-up signal includes a first station (STA) ID field that indicates a particular wireless device from the group as being a representative of the group for responding to the wake-up signal.

19. A wireless device that is to operate in a wireless network, the wireless device comprising:
a wake-up receiver;
a main radio;
a memory device storing a set of instructions; and
a processor coupled to the memory device, wherein the set of instructions when executed by the processor causes the wireless device to:
wirelessly receive, via the wake-up receiver, a wake-up signal from another wireless device indicating an upcoming downlink data frame transmission, and
wirelessly transmit, via the main radio, a response frame to the another wireless device as a response to the wake-up signal after activating a radio frequency or baseband component of the main radio but before a program for execution is completely loaded into a processor for data frame reception and thus before a full transition delay has elapsed after the wake-up signal was received for the main radio to fully transition from being in a doze state to being in an awake state.

20. The wireless device of claim 19, wherein the set of instructions when executed by the processor further causes the wireless device to:
wirelessly receive a data frame from the another wireless device after the main radio has fully transitioned from being in the doze state to being in the awake state.

* * * * *